J. G. Mini.
Making Lamp Black.
No. 223. Reissued Aug. 24, 1852.
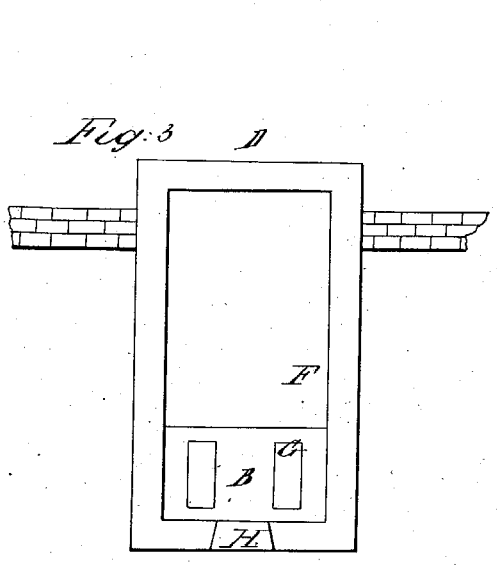
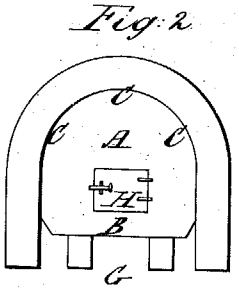
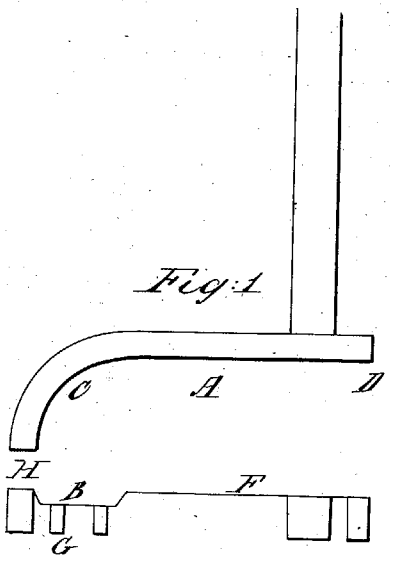

UNITED STATES PATENT OFFICE.

J. G. MINI, OF PHILADELPHIA, PENNSYLVANIA.

IMPROVEMENT IN MAKING LAMP-BLACK.

Specification forming part of Letters Patent No. 3,824, dated November 13, 1844; Reissue No. 223, dated August 24, 1852.

*To all whom it may concern:*

Be it known that I, JOHN GILBERT MINI, of Philadelphia, State of Pennsylvania, have invented a new and useful Improvement in the Manufacture of Lamp-Black; and I do hereby declare that the following is a full and exact description.

The nature of my improvement consists in being able to burn the material in large quantities and in obtaining one hundred per cent. more lamp-black from the same quantity of material than had been obtained before this invention was known.

To enable others skilled in the art to make and use my improvement, I will proceed to describe its construction and operation.

If it be desirable to burn the bulk of a barrel of rosin or other material at one time, the room should contain an area of eighty feet by fifty feet and forty feet high, and in proportion for a greater or less quantity, or thereabout.

I construct my furnace of brick or iron, as seen in the accompanying drawing, and in the furnace I place a cast-iron pot or pan, as at B, and an arch tunnel from the front and sides of the pan, as at C, this arch to be continued into the building or room which receives the lamp black, as shown at D. At the bottom of the tunnel and level with the top of the pan I lay a brick hearth extending into the room, as shown at F. At the front of the pan in the furnace I make a door or opening in the wall to admit the material, which, together with all the windows or vent holes, must be closed tight immediately on applying the fire to the material, as shown at H.

The building or room used to receive the lamp-black must have sufficient lower and upper windows or vents for rapid ventilation. So soon as the material is done burning and has been left about thirty minutes to settle, then open the upper and lower windows for about fifteen minutes to allow the foul air to escape and fresh air to take its place. Then shut up again, having the material introduced first, and see that all is tight as before, &c. Having as much lamp-black on the floor as you desire, take it out between the fires into the packing-room.

What I claim as my invention and improvement, and desire to secure by Letters Patent, is—

The mode herein described of burning lamp-black—that is to say, burning it in a confined building or room without chimney or draft, substantially in the manner set forth in the above specification.

J. G. MINI.

Witnesses:
GEO. JACKSON,
GEO. W. ASH.